United States Patent [19]

Castellani et al.

[11] Patent Number: 5,763,826
[45] Date of Patent: Jun. 9, 1998

[54] FIRE-RATED MULTIPLE-OUTLET IN-FLOOR FITTING

[75] Inventors: Norman Castellani, Park Ridge, N.J.; Harcharan S. Bagga, Bronx, N.Y.

[73] Assignee: Raceway Components, Inc., Paterson, N.J.

[21] Appl. No.: 345,253

[22] Filed: Nov. 28, 1994

Related U.S. Application Data

[63] Continuation of Ser. No. 223,438, Apr. 5, 1994, abandoned, which is a continuation of Ser. No. 812,632, Dec. 23, 1991, abandoned.

[51] Int. Cl.$^6$ ............................................. H02G 3/22
[52] U.S. Cl. ........................... 174/48; 52/220.8; 439/650
[58] Field of Search ........................... 174/48; 52/220.8; 439/650

[56] References Cited

U.S. PATENT DOCUMENTS

| | | | |
|---|---|---|---|
| 2,705,785 | 4/1955 | Benander | 439/650 X |
| 4,091,231 | 5/1978 | Sotolongo | 174/48 |
| 4,249,789 | 2/1981 | Lee | 439/650 |
| 4,323,724 | 4/1982 | Shine | 174/48 |
| 4,770,643 | 9/1988 | Castellani et al. | 174/48 |

*Primary Examiner*—Kristine L. Kincaid
*Assistant Examiner*—Dean A. Reichard
*Attorney, Agent, or Firm*—Fulwider Patton Lee & Utecht, LLP

[57] ABSTRACT

A fitting, adapted to fit in a hole formed in a fire-rated floor, to enable activated wires to be connected thereto and therethrough for activation as an outlet. The fitting includes a receptacle which includes a plurality of bus bars adapted to connect and isolate current inputs to enable the fitting to accommodate multiple power plugs for multiple electronic devices. The receptacle further includes plug blade retention contacts adapted to firmly grip, retain, and provide positive contact and connection between plug blades and receptacle outlets. It further includes grounding contacts and wires adapted to effectively ground electronic equipment. The fitting further includes a service head adapted to extend substantially flush with the top of a carpet, to prevent unsafe obstruction of the carpet, and sliding plates adapted to automatically and positively cover receptacle outlets to prevent electrical shock. It further includes intumescent rings and phenolic insulating rings adapted to seal the floor hole and wires extending through the fitting, to enable the fire rating of the floor to be substantially the same with or without the hole and fitting therein.

32 Claims, 5 Drawing Sheets

FIRE-RATED MULTIPLE-OUTLET IN-FLOOR FITTING

This application is a continuation of application Ser. No. 08/223,438, filed Apr. 5, 1994, now abandoned, which was a continuation of application Ser. No. 07/812,632, now abandoned, filed Dec. 23, 1991.

BACKGROUND OF THE INVENTION

The invention relates generally to a fitting for providing outlets in a floor. It relates specifically to a fire-rated multiple-outlet in-floor fitting.

It has been known to provide a fitting which includes a power receptacle including a pair of outlets arranged in tandem, adapted to be installed in a fire-rated concrete floor, and adapted to function to enable the fire-rating of the floor to be substantially the same with or without the hole and fitting therein, as disclosed, for example, in Kohaut U.S. Pat. No. 3,995,102, and Castellani et al. U.S. Pat. No. 4,770,643.

However, the receptacle configuration of known fittings limited the power capacity thereof, while the demand for higher power capacity has increased substantially due to the increasing quantity and sophistication of electronic devices for office workstations. This has generated increased demand for higher power capacity at each workstation.

It is desirable for fittings to safely and effectively accommodate multiple power connections, with multiple communications and/or data pass-throughs, while preventing through-floor transmission of heat and flame from a fire.

Further, it is desirable for such fittings to safely and effectively accommodate increased copper in increased numbers of power lines, while retaining the fire rating of the fitting and floor, and while additionally accommodating communication and or data wires.

It is further desirable for such fittings to provide positive contact and connection between power wires and receptacle outlets.

Further, it is desirable for such fittings to safely and effectively accommodate, hold fast, and firmly seat an increased number of plugs, and to provide increased plug blade contact and support, as required for compliance with fire and electrical safety codes, and for certification in plug retention tests at independent commercial testing laboratories.

Such codes and tests require that the plug cap be held securely, since increased vibration of the plug due to unsecure retention causes arcing, forming carbon deposits, which render the plug unusable and causes short circuits.

Further, it is desirable for fire safety for such fittings to prevent the transmission through the floor of heat and flame from a fire, in order to pass fire safety tests at an independent commercial testing laboratory, to preserve the fire rating of the floor, to accommodate increased power wires, and to comply with the requirements of national and local fire and electrical safety codes.

Further, it is desirable for such fittings to prevent unsafe obstructions from projecting in the floor, such as the known box-like dog-house fitting service head.

Further, it is desirable for such fittings to be aesthetically appealing and attractive for commercial purposes.

Further, it is desirable for such fittings to reduce electrical noise which generates electromagnetic interference with electronic equipment.

Further, it is desireable for such fittings to automatically cover non-active power receptacle outlets when not in use,
for electrical safety. Such fittings may be unsafe and subject to electrical shock hazard where ready access to the receptacle is enabled without positive cover movement.

Still further, it is desirable for such fittings to provide separate power circuits for separate electronic devices, to prevent electrical interference therebetween.

SUMMARY OF THE INVENTION

The fitting of the invention is adapted to overcome the above problems, as well as others, associated with known fittings.

The fitting of the invention is adapted to provide increased power capacity to meet the demand therefor resulting from the increasing quantity and sophistication of electronic devices for office workstations, to provide safe and effective accommodation of multiple power connections with multiple communications and/or data pass-throughs, to reduce electrical noise which generates electromagnetic interference with electronic equipment, and to be capable of being configured to provide separate power circuits for separate electronic equipment.

It is further adapted to enable the fire rating of the floor to be substantially the same with or without the hole and fitting therein, for safe and effective increased power capacity and non-power accommodation, and for safe and effective prevention of through-floor transmission of heat and flame from a fire, to comply with the requirements of fire and electrical safety codes, and to comply with the requirements of fire and electrical safety testing at an independent commercial testing laboratory.

It include s a multiple outlet receptacle adapted to accommodate multiple power plugs for activation of multiple electronic devices, including a plurality of elements adapted to be configured and mounted so as to connect multiple current inputs of the same type, and isolate multiple current inputs of the different type, in the receptacle outlets, and fitting slot channels adapted to accommodate multiple non-power wires passing therethrough for activation of devices.

The multiple outlet receptacle and fitting slot channels provide increased power capacity to meet the demand therefor resulting from the increasing quantity and sophistication of electronic devices for office workstations, and provide safe and effective accommodations of multiple power connections with multiple communications and/or data pass-throughs and reduce electrical noise which generates electromagnetic interference with electronic equipment.

It further includes a plurality of elements for sealing the hole in the floor and the wires passing through the fitting, upon activation by heat and flame from a fire. The sealing elements, upon activation, absorb heat, expand and flow into the spaces in the fitting and about the wires.

It further includes a plurality of elements for dissipating heat upon activation by heat and flame from a fire. The heat dissipating elements are positioned adjacent the plurality of sealing elements, and absorb heat, cure, cross-link, emit water, and dissipate heat upon activation thereof.

The fitting is further adapted to provide positive contact and connection between power wires and receptacle outlets, and to accommodate, securely hold, and firmly seat an increased number of power plugs in the receptacle outlets, to prevent arcing which would form carbon deposits, rendering the outlet unusable, and causing short circuits.

It includes plug blade and prong retention contacts for engaging and securely retaining plug blades upon insertion thereof in corresponding outlet slots. The retention contacts firmly grip and retain, and provide positive contact and connection between, plug blades and receptacle outlets, and accommodate, securely hold, and firmly seat the increased number of power plugs in the receptacle outlets, to prevent arcing and the formation of carbon deposit, to prevent rendering the outlets unsafe and unusable, and to prevent short circuits.

The fitting is further adapted to extend above the floor substantially flush with the top of a carpet adapted to be installed on the floor, for preventing an unsafe obstruction from projecting substantially above the top of the carpet, and to provide a commercially attractive and aesthetically appealing fitting.

It includes a top portion extending above the floor substantially flush with the top of the carpet, to prevent an unsafe projecting obstruction from extending substantially above the floor, and to provide a commercially attractive and aesthetically appealing fitting.

The fitting is further adapted to automatically and positively cover receptacle outlets when not in use, to prevent accidental electrical shock from ready access to exposed receptacle outlets, and to comply with the requirements of electrical and water safety tests at an independent commercial testing laboratory.

In includes sliding cover plates, biased to automatically and positively cover the receptacle outlets when not in use, to prevent electrical shock from ready access to such outlets.

The fitting is further adapted to provide separation of power circuits for a plurality of clean electrical circuits without electrical cross-noise from electromagnetic interference with electronic equipment.

The fitting is further adapted to provide isolated grounding of the electronic equipment, for safe and efficient grounding of such equipment.

It includes ground contacts isolated from the receptacle mounting position, and an isolated grounding conductor which terminates directly at the equipment conductor terminal, for safe and effective isolated grounding of the electronic equipment.

DESCRIPTION OF THE PREFERRED EMBODIMENT

The fitting 10 of the invention, in the preferred embodiment as shown in FIGS. 1–8 and described below, is adapted to fit in a hole A having a wall B formed in a fire-rated concrete floor C to enable an activated wire or wires to be connected to, and through, fitting 10, for activation thereof as an outlet therefor.

Fitting 10 is adapted to accommodate substantial power capacity, in which the power capacity of the fitting is substantially greater than the power capacity of a standard three inch fitting for enabling a plurality of devices to be plugged thereinto. It is further adapted to enable the fire rating of floor C to be substantially the same with or without hole A and fitting 10 therein.

Hole A may be formed by core-drilling concrete floor C. The activated wire or wires may comprise power, telephone, data, and/or other wires, which originate from sources below floor C and pass through fitting 10. The power wires include insulation, and may be pre-wired to run through fitting 10.

Figure 1:
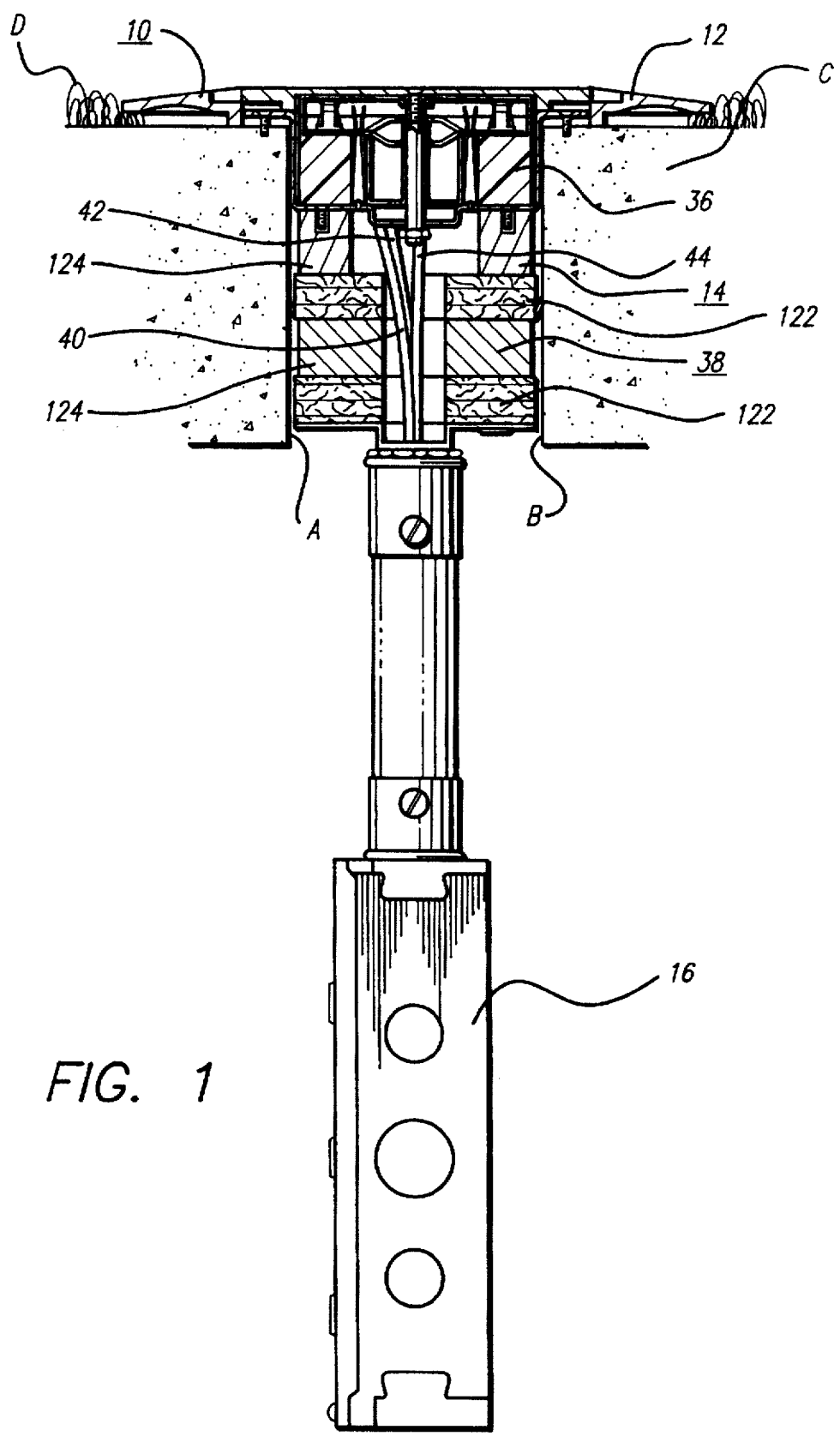
FIG. 1 is an elevational partly cross-sectional view of a fitting in the preferred embodiment of the invention, installed in an opening in a floor.
Figure 3:
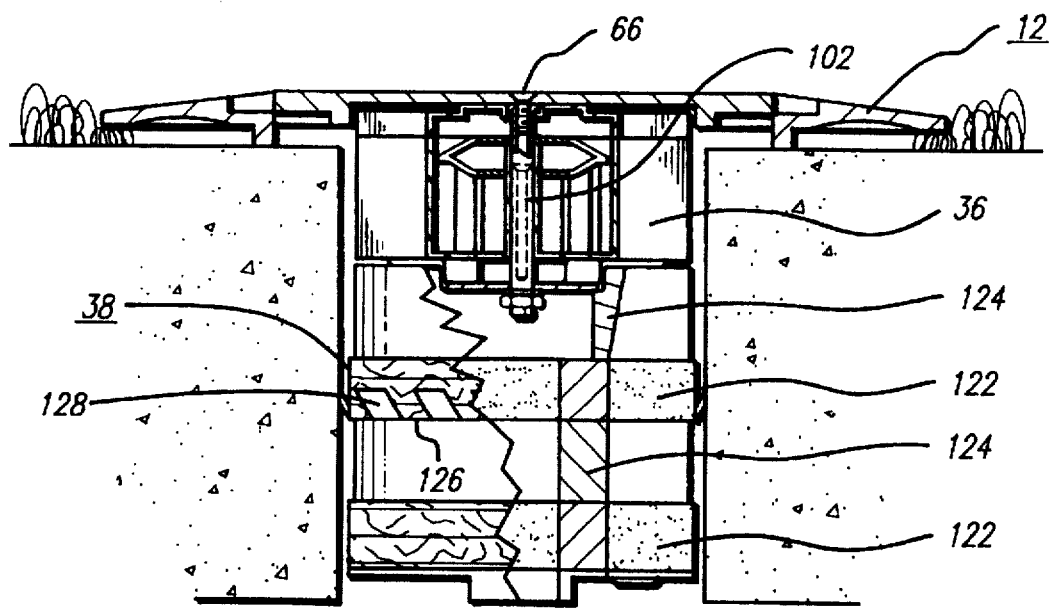
FIG. 3 is an elevational cross-sectional view of the service head and insert portions of the fitting of the invention taken along line 3—3 in FIG. 2.
Figure 4:
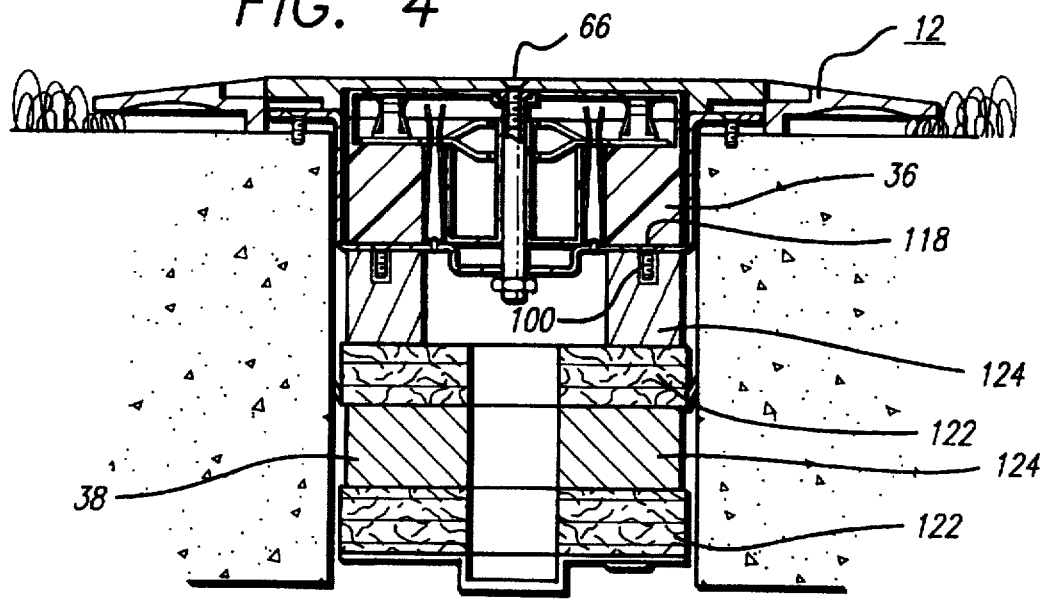
FIG. 4 is a similar view thereof taken along line 4—4 in FIG. 2.

Fitting 10, as shown in FIGS. 1, 3 and 4, includes a service head 12, and an insert 14 adapted to be connected to service head 12. A junction box 16 is adapted to be connected to insert 14. The activated wire or wires which are connected to and pass through fitting 10 originate from sources below floor C, and preferably include power wires, which are connected to fitting 10 in junction box 16, and telephone, data, or other non-power wires, which pass through insert 14 and service head 12 of fitting 10.

Service head 12, as shown in FIGS. 1–4, is adapted to extend above floor C so as to be substantially flush with the top of a carpet, as D, adapted to be installed on floor C, without extending substantially above the top of carpet D.

Service head 12 includes a generally disk-shaped finishing ring 18, and a slide holder portion 20. Finishing ring 18 includes a plurality of recessed flat portions 22, adapted to enable slidable movement thereover.

Figure 2:
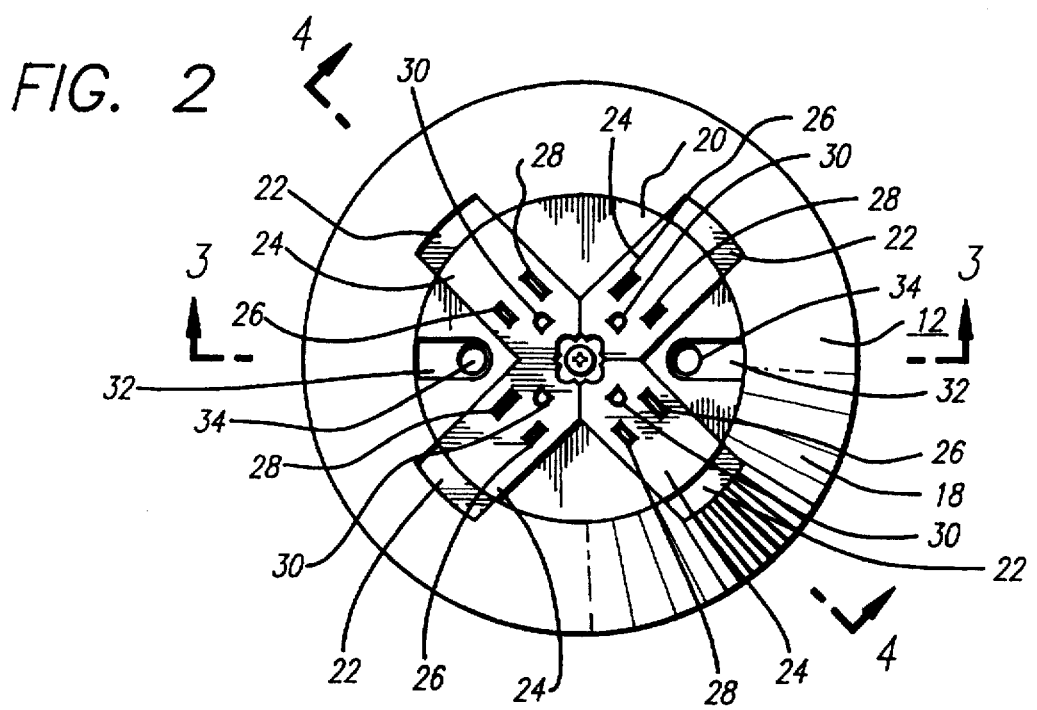
FIG. 2 is a top plan view of the fitting of the invention.

Slide holder portion 20, as shown in FIG. 2, includes a plurality of slide plates 24, each adapted to be slidably movable in a track in slide holder portion 20. Slide plates 24 each include a slot 26 adapted to accept a plug line conductor blade, a slot 28 adapted to accept a plug neutral conductor blade, and a hole 30 adapted to accept a plug ground conductor prong.

Slide plates 24 are adapted to be biased in the generally radially inward, direction, and to be slidable in the generally radially outward direction against bias pressure, to normally cover fitting 10.

Slide holder portion 20 further includes a pair of side slot members 32, each having an opening 34 therein adapted to enable a communications or data wire to pass therethrough, adapted to isolate the communication and/or data wires from the power wires.

Insert 14 includes a receptacle 36, adapted to enable activation of fitting 10, and a fire retarding portion 38, adapted to reduce the hazard and prevent transmission of heat and flame from a fire through fitting 10 and opening A in floor C, and to enable the fire rating of floor C to be substantially the same with or without hole A and fitting 10 in floor C.

Service head 12 is adapted to provide an outlet for receptacle 36, without an above-floor service fitting.

Receptacle 36 of fitting insert 14, as shown in FIGS. 1 and 3–8, is adapted to be mounted in fitting 10, to enable line conductor wire 40, neutral conductor wire 42, and ground wire 44, to be connected thereto for activation of fitting 10. Line conductor wire 40, neutral conductor wire 42, and ground wire 44 are preferably pre-wired in fitting 10.

Figure 8:
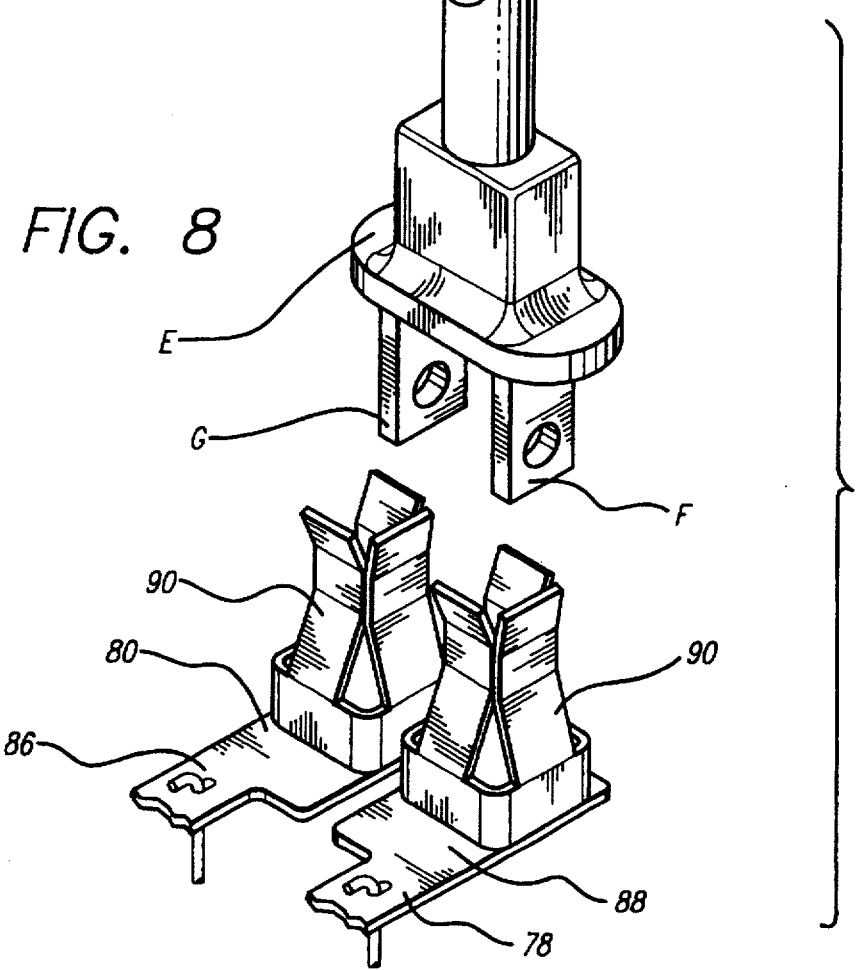
FIG. 8 is a partly-broken perspective view of plug and receptacle contacts, and bus bar legs and contact plates, in the fitting of the invention.

Receptacle 36 is further adapted to accommodate substantial power capacity in which the power capacity of the receptacle in the fitting is substantially greater than the power capacity of a standard receptacle in a standard three inch fitting, for enabling a plurality of devices to be plugged thereinto, and to accept a plurality of plugs, as plugs E in FIG. 8, which plugs E each include a line conductor blade F, a neutral conductor blade G, and a ground prong (not shown).

Figure 6:
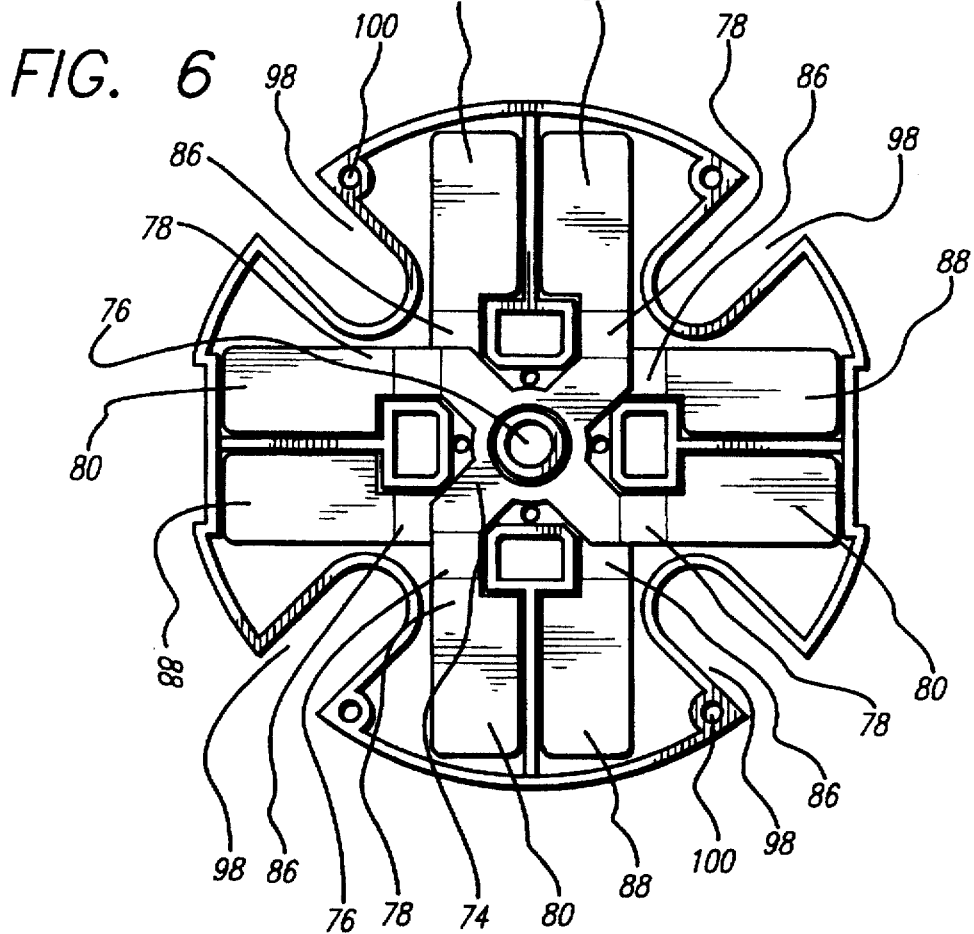
FIG. 6 is a top plan view of the bus bars and mounting housing of the receptacle in the fitting of the invention.
Figure 5:
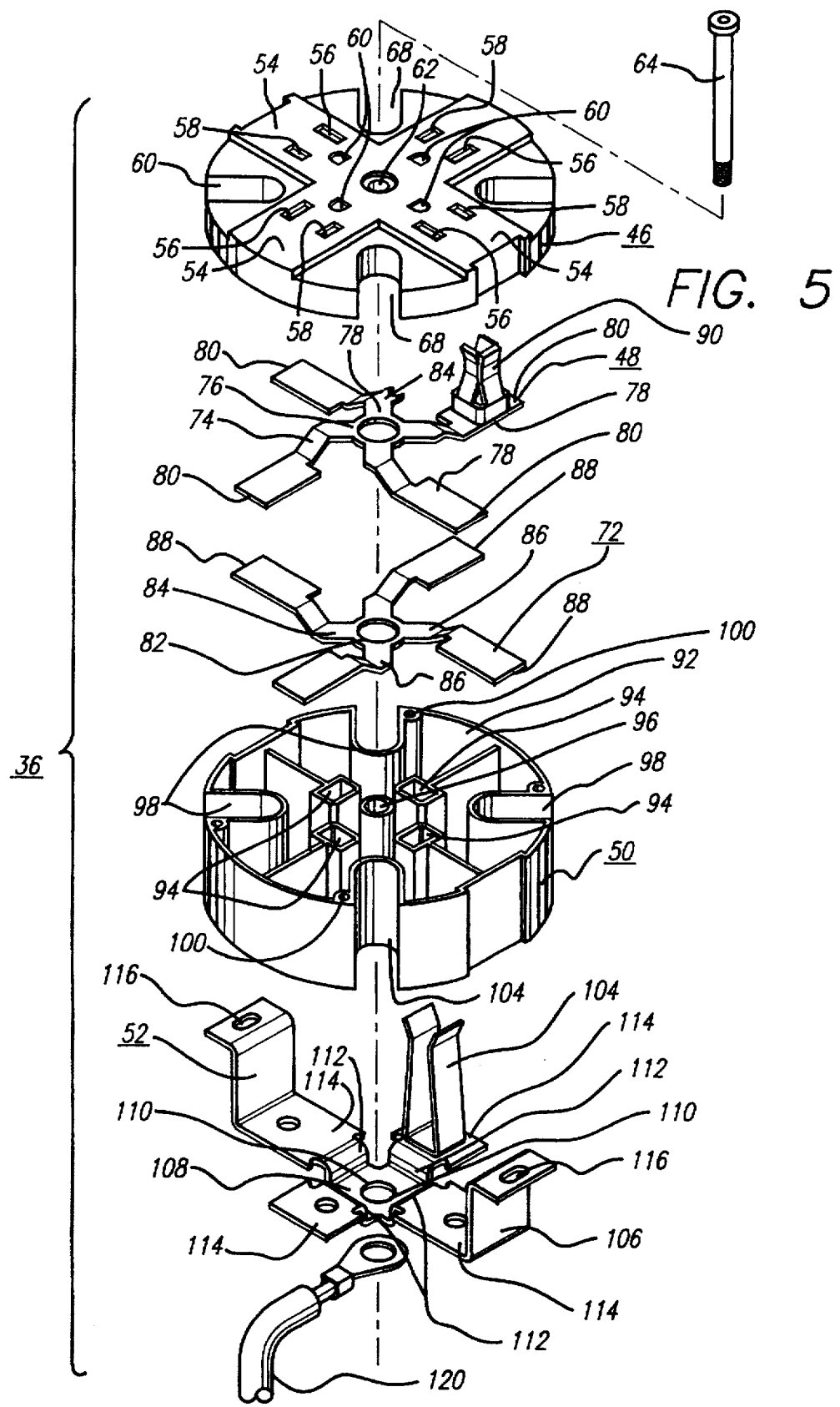
FIG. 5 is an exploded perspective view of the receptacle in the fitting of the invention.
Figure 7:
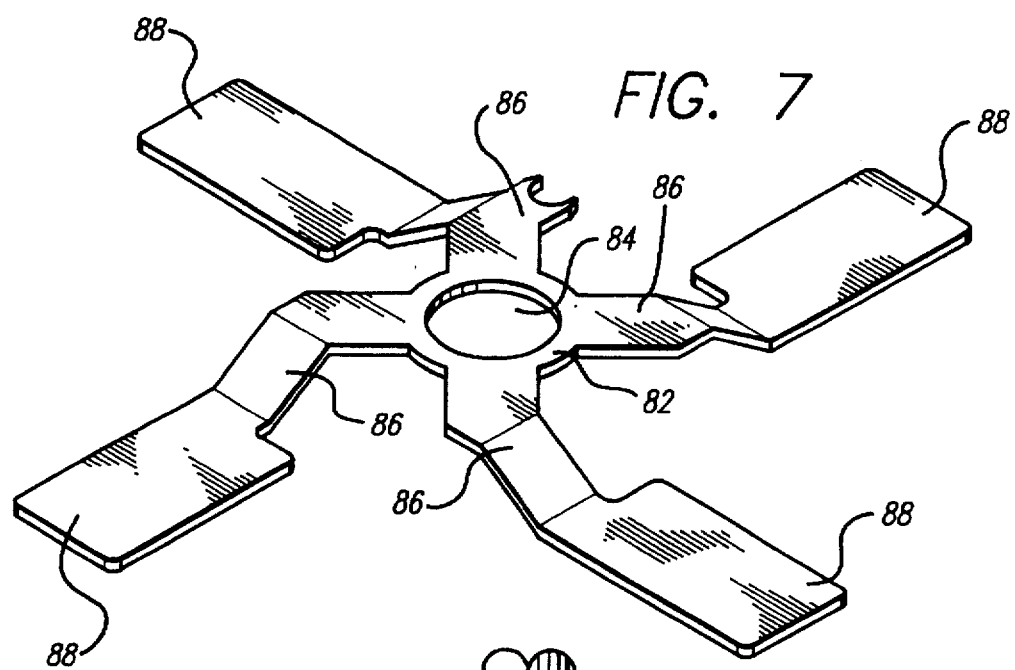
FIG. 7 is a perspective view of a bus bar of the receptacle in the fitting of the invention.

Receptacle 36, as shown in FIGS. 5, 6 and 8, includes a cover 46, first elements 48, adapted to interconnect and isolate line and neutral connections, a mounting housing 50, and second elements 52, adapted to connect and isolate ground connections.

Receptacle cover 44 includes a plurality of outlets 54, including a plurality of line conductor slots 56, each adapted to accept a plug line conductor blade F, a plurality of neutral conductor slots 58, each adapted to accept a plug neutral conductor blade G and to be paired with a line conductor slot 54, and a plurality of ground slots 60, each adapted to accept a plug ground prong (not shown). Receptacle cover 44 further includes a central opening 62, adapted to receive threaded sleeve 64 which is adapted to receive assembly screw 66.

Receptacle 36, in the preferred embodiment thereof, includes four line conductor slots 56, four neutral conductor slots 58, and four ground slots 60, forming a quadruple outlet receptacle. Ground slots 60 in receptacle cover 44 are spaced proximate to, and substantially equal distances from and concentrically about, central opening 62.

Pairs of line conductor slots 56 and neutral conductor slots 58 are spaced substantially equal distances from, and generally concentrically about, central opening 62, and further from central opening 62 than ground slots 60.

Slide plates 24 of service head 12 are biased so as to normally cover line conductor slots 56, neutral conductor slots 58, and ground slots 60 in receptacle 36. Upon pulling slide portions 22 generally radially outwardly, such that line slots 26 align with line conductor slots 56, neutral slots 28 align with neutral conductor slots 58, and ground holes 30 align with ground slots 60, and receptacle 36 accepts plugs E.

Receptacle cover 44 further includes a plurality of side slots 68, adapted to enable low-voltage wires to pass therethrough.

First elements 48 of receptacle 36 include a line bus bar 70 adapted to interconnect the plurality of line conductor slots 56 and to isolate the plurality of neutral conductor slots 58, and a neutral bus bar 72, adapted to interconnect the plurality of neutral conductor slots 58 and to isolate the plurality of line conductor slots 56.

Line bus bar 70 and neutral bus bar 72 are adapted to be inverted relative to each other and positioned in the supported position in receptacle 36.

The shapes of line bus bar 70 and neutral bus bar 72 are substantially the same, and are further such that line bus bar 70 and neutral bus bar 72 are adapted to be isolated from each other upon inversion and complementary positioning thereof in receptacle 36.

Line bus bar 70 and neutral bus bar 72 are generally x-shaped.

Line bus bar 70 includes a central portion 74 having a central opening 76 adapted to receive threaded sleeve 64, a plurality of bent legs 78 extending generally radially outwardly from central portion 74, and a plurality of contact plates 80 at the outer ends of legs 78.

Neutral bus bar 72 includes a central portion 82 having a central opening 84, a plurality of bent legs 86 extending generally radially outwardly from central portion 82, and a plurality of contact plates 88 at the outer ends of legs 86.

Line conductor wires 40 are adapted to be connected to line bus bar 70 at contact plates 80. Neutral conductor wires 42 are adapted to be connected to neutral bus bar 72 at contact plates 88.

Legs 86 of neutral bus bar 72 are adapted, upon positioning thereof in receptacle 36, to tunnel under line bus bar 70.

Receptacle 36 further includes a plurality of contacts 90, adapted to retain plug line conductor blades F and plug neutral conductor blades G in position plugged into receptacle line conductor slots 56 and receptacle neutral conductor slots 58.

Contacts 90 are adapted to be mounted on line bus bar contact plates 80 and neutral bus bar contact plates 88. Each contact 90 is generally inverted T-shaped in cross-section.

Mounting housing 50 of receptacle 36 includes support frame 92, a plurality of ground slots 94, a central opening 96, adapted to receive threaded sleeve 64, a plurality of side slots 98, adapted to enable low voltage wires to pass therethrough, and mounting screw holes 100 adapted to receive mounting screws 102.

Second elements 52 of receptacle 36 include a plurality of contacts 104, adapted to retain the plug ground prongs in position plugged into receptacle ground slots 60, and to extend through ground slots 94 of mounting housing 50, a mounting strap 106, including a central portion 108 having a central opening 110, a plurality of bent legs 112 extending generally radially outwardly from central portion 108, a plurality of contact plates 114 at the ends of legs 112 to which contacts 104 are adapted to be mounted, and mounting screw holes 116 adapted to receive mounting screws 118, and a ground wire 120, adapted to be connected to mounting strap 106.

Ground wires 44 are adapted to be connected to mounting strap 106 at contact plates 114.

Grounding wire 120 is adapted to be connected to mounting strap 106 at central potion 108, and to terminate directly at the electronic equipment conductor terminal (not shown), for isolated grounding of the electronic equipment.

Receptacle 36 may be configured to provide separate power circuits for separate circuits for electronic equipment. Receptacle 36 is comprised of a thermo-set compound, preferably Urea, to enable the fitting to retain its fire rating. The industry standard for receptacle is nylon, which is unsatisfactory for fire testing purposes.

Fire retarding portion 38 of fitting insert 14, as shown in FIGS. 1, 3, and 4, includes a plurality of intumescent rings 122, adapted to seal fitting 10 in hole A in floor C, and a plurality of phenolic insulating rings 124, adapted to insulate fitting 10 in hole A in floor C.

Intumescent rings 122 are adapted to expand with pressure upon being subjected to heat, radially inwardly to the wires extending through fitting 10, and outwardly so as to fill the space in floor hole A.

Phenolic insulating rings 124 are adapted to absorb and dissipate heat upon being subjected thereto.

Service head openings 34, receptacle cover side slots 68, receptacle mounting housing side slots 98, and channels in intumescent rings 122 and phenolic insulator rings 124 (not shown) form channels for passing non-power wires therethrough.

Fitting insert 14, as shown in FIG. 1, 3 and 4, further includes a retainer 126, adapted to retain fitting 10 in hole A.

Retainer 126 includes a plurality of tabs 128, adapted to flex and grip wall B of hole A to hold fitting 10 in hole A.

Fitting junction box 16, as shown in FIG. 1, is adapted to enable power wires originating from sources below floor C to be connected to pre-wired line conductor wire 40, neutral conductor 42, and ground wire 44, for activation of receptacle 36, and is preferably narrower than hole A in floor C, to enable installation of fitting 10 in hole A from above floor C.

Junction connections and junction boxes other than as shown in FIG. 1 may be used to form a part of fitting 10.

To install fitting 10 in floor C, floor C may be core-drilled to form hole A having wall B.

Fitting 10 may then be oriented relative to hole A and pushed thereinto until service head 12 is seated on floor C. Junction box 16, which is preferably narrower than the core-drilled hole A in floor C, enables fitting 10 to be inserted directly into and through hole A in floor C from above floor C. Retainer tabs 128 flex and grip wall B of hole A to retain fitting 10 in hole A.

The telephone, data, or other non-power wires may then be pulled from sources below floor C, through side slots 98 in mounting housing 50, side slots 68 in receptacle cover 46, and side slot openings 34 in service head 12, and connected to devices such as telephones, computers, or the like for activation thereof.

The power wires, originating from sources below floor C, may then be connected in junction box 16, to pre-wired line conductor wire 40, neutral conductor wire 42, and ground wire 44, for activation of receptacle 36.

To remove fitting 10 and abandon the location where fitting 10 was installed, all power and non-power wires may be disconnected, service head 12 is removed, and insert 14 and junction box 16 are pushed through hole A and may then be re-used. To maintain the fire-rating of floor C at the abandoned location, a fire-rated abandoning fitting (not shown) may be installed. To abandon a fitting 10 without removing it, service head 12 may be removed and a fire-rated abandoning plate (not shown) may be connected to insert 14 and installed at the abandoned (no service) location.

In operation, upon occurrence of a fire below floor C, heat and flame from the fire rise through hole A, activating the fire transmission preventing elements in insert 14.

Intumescent rings 122 absorb heat, and are activated to expand into openings in hole A, about insert 14, about pre-wired line conductor wire 40, neutral conductor wire 42, and ground wire 44 extending therethrough, and through the wire insulation, under pressure. They form flexible foam seals, sealing openings, burning the insulation off the wires, and forming very strong refractory chars. They seal openings to form efficient heat and smoke barriers, retarding transmission of heat and flame from the fire.

Phenolic insulator rings 124 are activated to absorb heat, and to cure, cross-link, and emit water to dissipate heat in insert 14, upon activation by heat and flame from the fire, to provide better insulation.

Upon the occurrence of heat and flame from a fire, insert 14 is adapted to be activated to prevent the transmission of heat and flame from the fire therethrough. Insert 14 enables the fire rating of floor C to be substantially the same with or without hole A and fitting 12 therein.

In use, multiple plugs E from electronic devices may be plugged into receptacle 36, with the ground prongs connected closest to the central potion of receptacle 36, and the line blades F and neutral blades G connected at the peripheral portions of receptacle outlets 54 to accommodate multiple plugs E in multiple receptacle outlets 54.

Receptacle 36 of fitting 10, including line bus bar 70 and neutral bus bar 72 adapted to connect multiple current inputs of the same type and to isolate multiple current inputs of the different type in power plugs E, is adapted to accommodate multiple power plugs E for activation of multiple electronic devices, to meet the demand therefor resulting from the increasing quantity and sophistication of electronic devices for office workstations, to provide safe and effective accommodation of multiple power connections, to reduce electrical noise which generates electromagnetic interference with electronic equipment, and to be capable of being configured to provide separate power circuits for each pair of outlets or fore each outlet to provide separate circuits for separate electronic equipment.

Receptacle 36 of fitting 10, including plug blade retention contacts 90, is further adapted to engage and securely retain plug line conductor blades F and plug neutral conductor blades G upon insertion of plugs E in receptacle cover line conductor slots 56 and neutral conductor slots 58, to firmly grip, retain, and provide positive contact and connection between plug blades and receptacle outlets, plug blades and receptacle outlets. It prevents arcing and formation of carbon deposits, to prevent rendering the outlets unsafe and unusable and to prevent short circuits.

Receptacle 36 of fitting 10, including ground contact 104 and grounding wire 120, is further adapted to be isolated from the receptacle mounting position, and to provide an isolating ground which terminates directly at the equipment conductor terminal, for safe and effective grounding of electronic equipment.

Service head 12 of fitting 10 is adapted to extend above floor C substantially flush with the top of carpet D, to prevent an unsafe obstruction from projecting substantially above the top of carpet D, and to provide a commercially attractive and aesthetically appealing fitting.

Service head 12 of fitting 10, including slide plates 24, is further adapted to be biased so as to automatically and positively cover receptacle outlets 54 when not in use, to prevent electrical shock resulting from ready access to such receptacle outlets 54.

Insert 14 of fitting 10, including intumescent rings 122 and phenolic insulting rings 124, is adapted to seal hole A in floor C and to seal line conductor wire 40, neutral conductor wire 42, and ground wire 44 extending through insert 14, upon activation by heat and flame from a fire, for safe and effective prevention of through-floor transmission of heat and flame from a fire. It enables fitting 10 to comply with the requirements of fire and electrical safety codes and the requirements of fire and electrical safety testing at an independent commercial testing laboratory, to enable the fire rating of floor-C to be substantially the same with or without hole A and fitting 10 therein.

Service head 12 and insert 14 of fitting 10, including the channels formed by service head openings 34, receptacle cover side slots 68, and receptacle mounting housing side slots 98, and in intumescent rings 122 and phenolic insulating ring 124, are further adapted to provide safe and effective accommodation of multiple communications and/or data pass-throughs.

A preferred embodiment of the invention has been set forth above, for the purpose of explaining the invention. However, it is to be understood that variations in such embodiment may be within the scope and spirit of the invention as set forth in the claims.

We claim:

1. A fitting, adapted to fit in a hole of substantially a same diameter of about three inches as a hole formed in a fire-rated floor for a standard three-inch fitting, and adapted to enable wires to be connected in the fitting for activation of the fitting, in which a power capacity of the fitting is substantially greater than a power capacity of a standard three inch fitting for enabling a plurality of devices to be plugged thereinto, and adapted to be fire-rated such that a fire rating of the floor is substantially the same with or without the hole and fitting therein, comprising:

(a) a receptacle, adapted to be mounted in the fitting, to enable line and neutral conductor wires to be connected thereto for activation of the fitting, in which a power capacity of the receptacle is substantially greater than a power capacity of a standard receptacle in a standard three inch fitting receptacle for enabling a plurality of devices to be plugged thereinto, and to accept a plurality of plugs, which plugs each include a line conductor blade and neutral conductor blade, which receptacle includes:

(1) a plurality of line conductor slots greater in number than two as in a standard receptacle, each adapted to accept a plug line conductor blade;

(2) a plurality of neutral conductor slots greater in number than two as in a standard receptacle, each adapted to accept a plug neutral conductor blade and to be paired with a line conductor slot;

(3) means for interconnecting the plurality of line conductor slots and for isolating the plurality of neutral conductor slots;

(4) means for interconnecting the plurality of neutral conductor slots and for isolating the plurality of line conductor slots;

(5) means for connecting the line conductor wire to the line conductor slots interconnecting and isolating means; and (6) means for connecting the neutral conductor wire to the neutral conductor slots interconnecting and isolating means; and (b) means for preventing transmission of heat and flame from a fire through the fitting and the hole in the floor, adapted to enable the fire rating of the floor to be substantially the same with or without the hole and fitting therein.

2. A fitting as in claim 1, further comprising means for retaining the plug line conductor and neutral conductor blades in position plugged into the receptacle conductor line and neutral slots.

3. A fitting as in claim 1, further comprising a top portion, adapted to extend above the floor so as to be substantially flush with the top of a carpet adapted to be installed on the floor, which top portion is adapted to provide an outlet for the receptacle, without an above-floor service fitting.

4. A fitting as in claim 1, further adapted to enable a ground wire to be connected thereto, in which the plugs each further include a ground prong, and the receptacle further includes a plurality of ground slots, each adapted to accept one of the plug ground prongs, means for interconnecting the plurality of ground slots, and means for connecting the ground wire to the ground slots interconnecting means.

5. A fitting as in claim 1, in which the line conductor slots interconnecting and isolating means comprise a bus bar.

6. A fitting as in claim 1, in which the neutral conductor slots interconnecting and isolating means comprise a bus bar.

7. A fitting as in claim 1, in which the receptacle includes a central portion, and the pairs of the plurality of line and neutral conductor slots are spaced substantially equal distances from the central portion.

8. A fitting as in claim 1, further adapted to enable communication and/or data wires to pass therethrough, and further comprising means for isolating the communication and/or data wires from the power conductor wires.

9. A fitting as in claim 1, in which the plurality of line conductor slots comprise four line conductor slots.

10. A fitting as in claim 1, in which the plurality of neutral conductor slots comprise four neutral conductor slots.

11. A fitting as in claim 1, in which the heat and flame transmission preventing means comprise means for sealing the fitting in the hole in the floor.

12. A fitting as in claim 1, in which the heat and flame transmission preventing means comprise means for insulating the fitting in the hole in the floor.

13. A fitting as in claim 1, further comprising a junction box, adapted to be connected thereto.

14. A fitting as in claim 1, in which the receptacle is comprised of a thermo-set compound, adapted to enable the fitting to retain its fire-rating.

15. A fitting as in claim 2, in which the blades retaining means comprise a plurality of contacts mounted on the line conductor slots interconnecting and isolating means and the neutral conductor slots interconnecting and isolating means, adapted to retain the plug line and neutral conductor blades.

16. A fitting as in claim 3, in which the top portion further comprises means, normally closed, to cover the receptacle line and neutral conductor slots, for enabling connection of plug line and neutral conductor blades upon opening thereof from the normally-closed receptacle-slots covering position.

17. A fitting as in claim 4, in which the receptacle includes a central portion, and the plurality of ground slots are spaced substantially equal distances from the central portion.

18. A fitting as in claim 4, in which the fitting includes a ground connection, and the ground slots are isolated from the fitting ground connection.

19. A fitting as in claim 4, in which the receptacle includes a central portion, and the plurality of ground slots are spaced proximate the central portion.

20. A fitting as in claim 4, in which the receptacle includes a central portion, the plurality of line conductor slots and neutral conductor slots are spaced substantially equal distances from the central portion, the plurality of ground slots are spaced substantially equal distances from the central portion, and the plurality of line conductor slots and neutral conductor slots are spaced further from the central portion than the plurality of ground slots.

21. A fitting as in claim 5, in which the neutral conductor slots interconnecting and isolating means comprise a bus bar, and in which the shape of the line bus bar and the neutral bus bar are substantially the same.

22. A fitting as in claim 5, in which the neutral conductor slots interconnecting and isolating means comprise a bus bar, and in which the neutral bus bar includes leg portions adapted, upon positioning thereof in the receptacle, to tunnel under the line bus bar.

23. A fitting as in claim 11, in which the sealing means are adapted to expand with pressure upon being subjected to heat.

24. A fitting as in claim 12, in which the insulating means are adapted to absorb and dissipate heat upon being subjected thereto.

25. A fitting as in claim 14, in which each contact is generally T-shaped in cross-section.

26. A fitting as in claim 16, in which the normally-closed connection-enabling means comprise a track in the fitting top portion, at least one plate, adapted to be slidable in the top track, having openings formed therein adapted to be alignable with the receptacle line and neutral conductor slots, and means for biasing the plates into normally-closed position relative to the receptacle so as to normally cover the receptacle line and neutral conductor slots.

27. A fitting as in claim 17, in which the ground slots are spaced generally concentrically about the central portion.

28. A fitting as in claim 20, in which the line and neutral conductor slots are spaced generally concentrically about the central portion.

29. A fitting as in claim 21, in which the shape of the line and neutral bus bars is such that the line and neutral bus bars are adapted to be isolated from each other upon inversion and complementary positioning thereof in the receptacle.

30. A fitting as in claim 22, in which the line and neutral bus bars are adapted to be inverted relative to each other and positioned in the supporting position in the receptacle.

31. A fitting as in claim 23, in which the sealing means are comprising of intumescent material.

32. A fitting as in claim 24, in which the insulating means are comprised of a phenolic compound.

* * * * *